Jan. 31, 1956  A. H. STEADMAN  2,732,589
METHOD AND APPARATUS FOR MOLDING RUBBER
Filed May 28, 1952

INVENTOR.
AUDREY H. STEADMAN
BY
Irwin M. Lewis
ATTORNEY.

United States Patent Office 2,732,589
Patented Jan. 31, 1956

2,732,589

METHOD AND APPARATUS FOR MOLDING RUBBER

Audrey H. Steadman, Manhattan, Kans., assignor to United States Rubber Company, New York, N. Y., a corporation of New Jersey Application May 28, 1952, Serial No. 290,427

6 Claims. (Cl. 18—44)

This invention relates to a method and apparatus for molding rubber articles. In particular, the invention relates to a method and apparatus for molding slits in rubber articles to provide an anti-skid surface to the article.

The term slit is used herein to define an incision type opening, the side walls of which are normally in contact. This is in contrast to a slot which is a groove in which the side walls are normally spaced some distance apart.

The advantages of slits as contrasted to slots to provide an anti-skid surface for the tread of a vehicle tire is discussed in copending application, Serial No. 136,686, filed January 4, 1950, by George V. Constantakis and Joseph W. Karsai, now Pat. No. 2,708,959.

Heretofore such slits were provided by lacerating the article with sharp thin knives after the article had been molded and cured. Such a method therefore, required two distinct operations, namely molding the article and slitting the article.

It is one object therefore of the present invention to provide a method and apparatus by which the slits may be formed as a part of the molding and curing operation thereby eliminating the necessity of a separate slitting operation.

Another object of the invention is to provide a method and apparatus for molding anti-skid slits in the tread of a vehicle tire.

Another object is to provide apparatus for molding a combination of anti-skid slits and slots in the tread of a rubber vehicle tire.

Other objects and advantages of the invention will become apparent from the following description when read in conjunction with the accompanying drawings, wherein.

Figure 1:
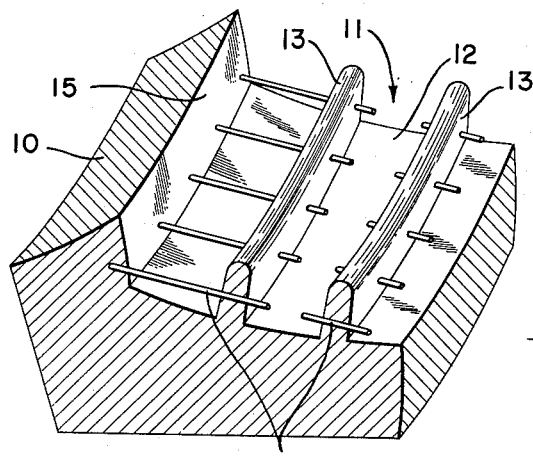
Fig. 1 is an isometric view of a section of a tire mold embodying one form of the invention.
Figure 2:
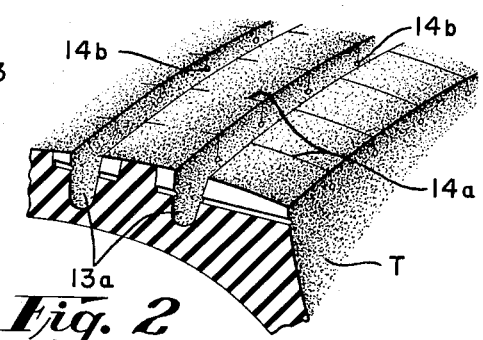
Fig. 2 is an isometric view of a section of a rubber tire formed in the tire mold of Fig. 1.
Figure 7:
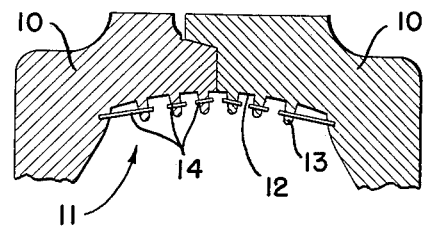
Fig. 7 is a partial sectional view of a tire mold of the type of Fig. 1 showing how two sections of the mold fit together to form the complete tire mold.

Referring to the drawings and in particular to Figs. 1 and 2, there is shown one embodiment of the present invention. This embodiment includes a conventional tire mold 10 provided with a molding cavity generally designated as 11 into which an uncured tire may be placed. The mold is only partially shown but it is to be understood that the mold is of the conventional construction well known in the art in which the mold is made in two annular halves which fit together to enclose the tire as shown in Fig. 7.

The mold of the present invention differs from conventional molds in the construction and form of the tread forming portion of the mold. In the embodiment shown in Fig. 1, the tread forming surface or wall 12 of the mold cavity is provided with outwardly extending circumferential ribs 13. These ribs form circumferential grooves 13a in the tread of the tire T as shown in Fig. 2.

The ribs 13 also provide a support for a plurality of transversely extending rigid rod-shaped core pieces 14, which extend through the ribs 13 and are rigidly secured thereto. The rods secured to the ribs which are adjacent the sides of the mold may have their ends embedded in the sidewall 15 of the mold to render them more rigid.

As can be readily seen in Fig. 1, the rods 14 are supported in the mold cavity a substantial distance from the tread-forming surface 12 of the mold 10. It can be seen, therefore, that when an uncured tire is placed in the mold and subjected to heat and pressure, that portions of the rubber tread stock will flow around the rods and reunite in the unobstructed space between the rods 14 and the tread-forming surface 12. If a suitable adhesive preventing substance such as soapstone is provided on the surface of the tread stock, the portions of the stock which flow around the rods will reunite in the unobstructed space between the rods 14 and the tread-forming surface 12, but will not adhere, thereby forming slits 14a in the surface of the tread as shown in Fig. 2.

In carrying out the method of the invention, the tread surface of the tire is coated with soapstone and as portions of the tread stock flow on either side of the rods 14, they carry with them a sufficient amount of the soapstone to prevent their adhering together when they reunite in the unobstructed space between the rods 14 and the tread-forming surface 12. The result is that slits 14a, the walls of which are normally in contact are formed in the tread surface of the tire.

The tire is left in the mold until properly cured. Small circular passages 14b are formed by the rods in the bottom of the slits as shown in Fig. 2. After curing, the soapstone acts as a lubricant to allow easy removal of the tire from the mold. The rubber tread stock is sufficiently resilient to allow the tire to be pulled from the rods 14 without damage either to the rods or the tire. Should some adhesion occur in the reunited portions of the tread stock, the portions will be separated by the core pieces 14 as the hot tire is pulled from the mold.

It is to be noted that the circular passages 14b at the bottom of the slits spread the stresses that otherwise might concentrate at the bottom of the slits and cause failure at this point.

Many variations of the structure of Fig. 1 may be made to give a variety of patterns. Two such variations are shown as Figs. 3 and 5.

Figure 3:
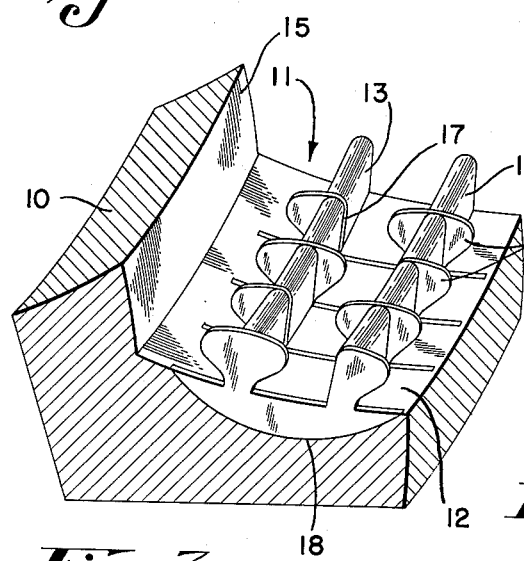
Fig. 3 is an isometric view of a section of a tire mold embodying another form of the invention.
Figure 4:
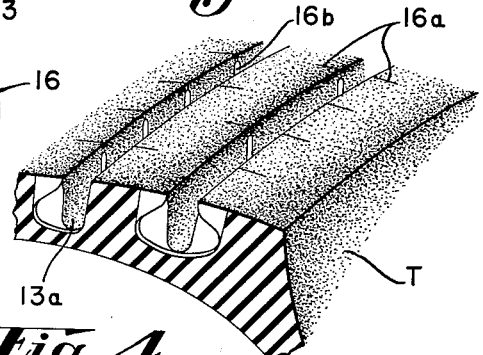
Fig. 4 is an isometric view of a section of a rubber tire formed in the tire mold of Fig. 3.

In Fig. 3, the ribs 13 are provided with a plurality of core pieces in the form of thin rigid inserts 16 which fit securely into slots 17 formed in the ribs 13 and in slots 18 formed in the tread-forming surface 12. That portion of the insert which extends above the tread-forming surface 12 is as narrow as the rib adjacent the base thereof but is considerably wider adjacent the top, so that a portion thereof extends transversely outwardly from the rib and an unobstructed space is thereby provided between the transversely extending portions of the insert and the tread-forming surface 12.

When an uncured tire is placed in the mold and subjected to heat and pressure, portions of the tread stock will flow on either side of the transversely extending portions of the insert 16 and will reunite in the unobstructed space between the transversely extending portions of the insert and the tread-forming surface 12 and will form slits 16a in the tread of the tire T as shown in Fig. 3. The inserts 16 form slots 16b beneath the slits 16a. A variety of patterns can be formed by varying the spacing of the inserts 16 and the length at which they are made to extend transversely from the ribs 13.

Figure 5:
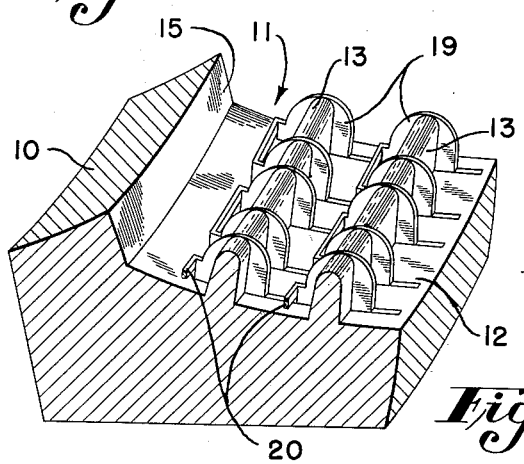
Fig. 5 is an isometric view of a section of a tire mold embodying still another form of the invention.
Figure 6:
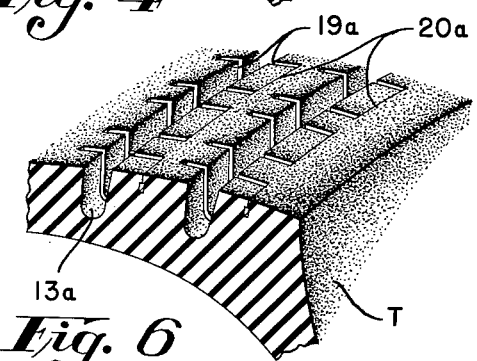
Fig. 6 is an isometric view of a section of a rubber tire formed in the tire mold of Fig. 5.

In Fig. 5, there is shown another variation which may be used to form both slots and slits in the tread surface of a tire. In this embodiment, a plurality of core pieces 19 in the form of thin rigid inserts are secured to the ribs 13 and the tread-forming surface 12 in a similar manner as described in conjunction with the inserts 16 of Fig. 3. The inserts 19 extend transversely outwardly from the ribs 13 and are wider adjacent the base of the rib than at the top so that they form slots 19a in the surface of the tread as shown in Fig. 6. Interconnecting the outer ends of the transversely extending portions of the inserts 19 are thin rigid sections 20 which are secured between pairs of the inserts 19 or formed integrally therewith. These thin sections 20 do not extend down to the tread-forming surface 12 but are spaced above the surface 12 to form an unobstructed space in which the tread stock may reunite to form slits 20a as shown in Fig. 6 in a similar manner as described in conjunction with the mold of Fig. 1.

From the above description, it can be seen that there is provided both a method and apparatus for molding anti-skid slits or a combination of slits and slots in the tread of a rubber tire. By the method and apparatus above-described, the slits may be formed in the tread of the tire during the molding and curing operation thereby eliminating the necessity of a separate slitting operation.

While the invention has been described in conjunction with molding anti-skid slits in rubber tires, it is to be understood that this is for the purpose of illustration and that the method and apparatus may be used for molding slits in other molded rubber articles.

Having thus desribed my invention, what I claim and desire to protect by Letters Patent is:

1. Apparatus for molding rubber vehicle tires comprising, a mold member having a cavity therein for receiving an uncured tire, an inwardly extending circumferential rib on the tread forming wall of the cavity, core members secured to said rib and extending transversely outwardly from said rib at a point spaced from said tread forming wall, at least a portion of the space between said outwardly extending core members and said tread forming wall being unobstructed, whereby when the tread stock of said uncured tire is caused to flow under heat and pressure, portions thereof will flow around said core members and reunite in said unobstructed space to form slits.

2. Apparatus for molding a rubber vehicle tire comprising, a mold member having a cavity therein for receiving an uncured tire, an inwardly extending circumferential rib formed on the tread forming wall of the cavity, small rods secured to and extending transversely outwardly from said rib at points spaced from said tread forming wall, at least a portion of the space between said outwardly extending rods and said tread forming wall being unobstructed whereby when the tread stock of said uncured tire is caused to flow under heat and pressure, portions thereof will flow around said rod and reunite in said unobstructed space to form slits.

3. Apparatus for molding a rubber vehicle tire comprising, a mold member having a cavity therein for receiving an uncured tire, an inwardly extending circumferential rib on the tread forming wall of the cavity, thin rigid sections secured to said rib and extending transversely outwardly from said rib at a point spaced from said tread forming wall, at least a portion of the space between said outwardly extending rigid sections and said tread forming wall being unobstructed whereby when said tread stock of said uncured tire is caused to flow under heat and pressure, portions thereof will flow around said rigid sections and reunite in said unobstructed space to form slits.

4. Apparatus for molding a rubber vehicle tire comprising, a mold member having a cavity therein for receiving an uncured tire, an inwardly extending circumferential rib formed on the tread forming wall of said cavity, thin rigid sections secured to said rib and extending transversely outwardly from said rib, and interconnecting thin rigid sections secured between some transversely extending sections, said interconnecting sections being spaced from said tread forming wall whereby when the tread stock of said uncured tire is caused to flow under heat and pressure, portions thereof will flow around said interconnecting sections and reunite in said space between said interconnecting members and said tread forming wall to form slits.

5. A method of forming slits in a rubber article comprising, coating the surface of a piece of substantially uncured rubber in which the slits are to be formed with an adhesion preventing substance, heating and forcing the surface against a core piece to cause portions of the rubber to flow past said core piece on either side thereof, forcing said portions into contact after they have passed said core piece and curing the rubber whereby said portions will be in contact but will not be adhered because of the presence of the adhesion preventing substance and thereby form a slit in the surface of the article.

6. A method of molding slits in the tread of a rubber vehicle tire comprising, coating the tread of an uncured tire with an adhesion preventing substance, placing said tire in a curing mold having core sections supported in the cavity of said mold spaced from the tread forming wall thereof, portions of said space between said core sections and said tread forming surface being unobstructed, curing said tire under heat and pressure whereby portions of the rubber will flow on either side of said core sections and contact in said unobstructed space without adhesion because of the presence of the adhesion preventing substance and thereby form slits in the surface of the tire tread and removing said tire from said curing mold after curing.

References Cited in the file of this patent

UNITED STATES PATENTS

| | | |
|---|---|---|
| 26,580 | Gately | Dec. 27, 1859 |
| 1,604,451 | Krusemark | Oct. 26, 1926 |
| 1,604,452 | Krusemark | Oct. 26, 1926 |
| 1,880,430 | Furnas | Oct. 4, 1932 |
| 2,275,582 | Bull | Mar. 10, 1942 |
| 2,295,763 | Sperry | Sept. 15, 1942 |
| 2,644,984 | Crooker | July 14, 1953 |